United States Patent
Ohara et al.

(10) Patent No.: US 10,945,225 B2
(45) Date of Patent: Mar. 9, 2021

(54) USER APPARATUS, AND PREAMBLE TRANSMISSION METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/482,668

(22) PCT Filed: Feb. 1, 2018

(86) PCT No.: PCT/JP2018/003494
§ 371 (c)(1),
(2) Date: Jul. 31, 2019

(87) PCT Pub. No.: WO2018/143375
PCT Pub. Date: Aug. 9, 2018

(65) Prior Publication Data
US 2019/0349873 A1 Nov. 14, 2019

(30) Foreign Application Priority Data
Feb. 3, 2017 (JP) .............................. JP2017-019142

(51) Int. Cl.
*H04J 3/06* (2006.01)
*H04W 56/00* (2009.01)
(Continued)

(52) U.S. Cl.
CPC .......... *H04W 56/001* (2013.01); *H04L 43/16* (2013.01); *H04W 52/36* (2013.01); *H04W 74/0833* (2013.01)

(58) Field of Classification Search
CPC .............. H04W 56/001; H04W 52/36; H04W 74/0833; H04W 16/28; H04W 74/08; H04L 43/16
(Continued)

(56) References Cited

U.S. PATENT DOCUMENTS 9,331,767 B1* 5/2016 Thomas ............... H04B 7/0695
2013/0114401 A1* 5/2013 Martin ................. H04W 28/04
370/225
(Continued)

FOREIGN PATENT DOCUMENTS

| JP | 2016-140068 A | 8/2016 |
|---|---|---|
| WO | 2016/022235 A1 | 2/2016 |
| WO | 2016/210302 A1 | 12/2016 |

OTHER PUBLICATIONS

Office Action issued in the counterpart Japanese Patent Application No. 2018-566102, dated Jun. 9, 2020 (5 pages).
(Continued)

*Primary Examiner* — Mang Hang Yeung
(74) *Attorney, Agent, or Firm* — Osha Bergman Watanabe & Burton LLP

(57) ABSTRACT

A user apparatus in a radio communication system including a base station and the user apparatus, including: a reception unit configured to receive a plurality of predetermined signals transmitted from the base station by a plurality of beams; and a transmission unit configured to transmit a preamble using a resource corresponding to at least one beam of the plurality of beams, wherein the reception unit measures a reception quality for each of the plurality of beams, and the transmission unit transmits the preamble using a resource corresponding to a beam of a reception quality that satisfies a predetermined condition.

11 Claims, 14 Drawing Sheets

(51) Int. Cl.
  *H04L 12/26* (2006.01)
  *H04W 52/36* (2009.01)
  *H04W 74/08* (2009.01)
(58) Field of Classification Search
  USPC ........................................................ 370/350
  See application file for complete search history.

(56) References Cited

U.S. PATENT DOCUMENTS

| 2016/0044517 | A1  | 2/2016 | Raghavan et al. |
| 2016/0219571 | A1  | 7/2016 | Lin et al. |
| 2017/0142741 | A1  | 5/2017 | Kaur et al. |
| 2017/0230926 | A1  | 8/2017 | Seo et al. |
| 2019/0081673 | A1* | 3/2019 | Athley .................. H04B 7/088 |

OTHER PUBLICATIONS

LG Electronics; "Discussion on RACH Procedure"; 3GPP TSG RAN WG1 NR ad hoc Meeting, R1-1700463; Spokane, USA; Jan. 16-20, 2017 (5 pages).

International Search Report issued in PCT/JP2018/003494 dated May 1, 2018 (4 pages).
Written Opinion of the International Searching Authority issued in PCT/JP2018/003494 dated May 1, 2018 (4 pages).
NTT Docomo, Inc.; "Discussion on 4-step random access procedure for NR"; 3GPP TSG RAN WG1 AH_NR Meeting, R1-1700614; Spokane, USA; Jan. 16-20, 2017 (8 pages).
3GPP TS 36.321 V14.0.0; "3rd Generation Partnership Project; Technical Specification Group Radio Access Network; Evolved Universal Terrestrial Radio Access (E-UTRA); Medium Access Control (MAC) protocol specification (Release 14)"; Sep. 2016 (96 pages).
Written Opinion of the Intellectual Property Office of Singapore issued in Patent Application No. 11201907066V dated Sep. 16, 2020 (10 pages).
Extended European Search Report issued in counterpart European Patent Application No. 18748170.0, dated Nov. 4, 2020 (8 pages).
Office Action in counterpart Japanese Patent Application No. 2018-566102 dated Nov. 17, 2020 (7 pages).

* cited by examiner

USER APPARATUS, AND PREAMBLE TRANSMISSION METHOD

TECHNICAL FIELD

The present invention relates to a user apparatus and a base station in a radio communication system.

BACKGROUND ART

In LTE (Long Term Evolution), random access (RA: Random Access) is performed when a user apparatus establishes a connection with a base station, or performs resynchronization (Non-Patent Document 1).

In 3GPP (3rd Generation Partnership Project), study of a radio communication scheme called 5G has been progressing for realizing further increase of system capacity, further increase of data transmission speed, and lower delay in radio sections and the like. In 5G, in order to satisfy the requirement to make the delay of the radio section equal to or less than 1 ms while realizing throughput equal to or greater than 10 Gbps, studies of various radio techniques are progressing. Since there is a high possibility in that radio techniques different from LTE are adopted in 5G, a radio network supporting 5G is called a new radio network (NR: New Radio) so that 5G is differentiated from a radio network supporting LTE in 3GPP. Note that NewRAT may be referred to as NR.

In 5 G, it is assumed that a wide range of frequency from a low frequency band similar to LTE to a frequency band higher than that of LTE is used. Especially, in the high frequency band, since propagation loss increases, it is being studied to apply beam forming of narrow beam width in order to compensate it.

PRIOR ART DOCUMENT

Non-Patent Document

[Non-Patent Document 1] 3GPP TS 36.321 V14.0.0 (2016-09)

SUMMARY OF INVENTION

Problem to be Solved by the Invention

It is considered that in the case of transmitting a signal by applying beamforming, the base station or the user apparatus determines the direction of a transmission beam (Tx-beam) such that reception quality becomes good in the communication partner side by performing beam search (beam sweeping) or the like. In the same way, it is considered that in the case of receiving a signal by applying beamforming, the base station or the user apparatus determines the direction of a reception beam (Rx-beam) such that reception quality from the communication partner side becomes good.

Here, also in NR, it is assumed that a random access procedure similar to the random access procedure in LTE is performed. However, in NR, it is being studied to apply beamforming as described above also in the random access procedure.

However, in the case in which beamforming is applied in the random access procedure, for example, when the user apparatus detects a plurality of base station side transmission beams, for which base station side transmission beam a RA preamble to transmit or the like is not clear in the conventional technique. In the conventional technique, there is a possibility that the random access procedure cannot be appropriately executed in the radio communication system to which beamforming is applied.

The present invention is made in view of the above-described points, and an object of the present invention is to provide a technique that enables a radio communication system having a user apparatus and a base station to appropriately execute a random access procedure to which beamforming is applied.

Means for Solving the Problem

According to a disclosed technique, there is provided a user apparatus in a radio communication system including a base station and the user apparatus, including:

a reception unit configured to receive a plurality of predetermined signals transmitted from the base station by a plurality of beams; and a transmission unit configured to transmit a preamble using a resource corresponding to at least one beam of the plurality of beams, wherein the reception unit measures a reception quality for each of the plurality of beams, and the transmission unit transmits the preamble using a resource corresponding to a beam of a reception quality that satisfies a predetermined condition.

Advantage of the Invention

According to a disclosed technique, there is provided a technique that enables a radio communication system having a user apparatus and a base station to appropriately execute a random access procedure to which beamforming is applied.

EMBODIMENTS OF THE INVENTION

Hereinafter, an embodiment of the present invention (present embodiment) will be described with reference to the accompanying drawings. The embodiments described below are only examples and embodiments to which the present invention is applied are not limited to the following embodiments.

In actual operation of the radio communication system of the present embodiment, existing techniques can be appropriately used. The existing techniques are techniques of LTE, for example, but not limited to LTE. In addition, "LTE" used in this specification has a broad meaning including LTE-Advanced and schemes after LTE-Advanced (example: 5G) unless otherwise specified.

In the following embodiment described below, terms RA preamble, RAR, messages 1-4, RAR window, SIB, and the like which are used in the existing LTE are used, but these terms are only used in convenience of description, signals or functions and the like similar to signals or functions indicated by the terms may be referred to as other names.

Also, in the present embodiment, a random access procedure based on the random access procedure prescribed in LTE is taken as an example. However, the application destination of the present invention is not limited to the random access procedure. The present invention is also applicable to communication procedures other than the random access procedure.

Also, selecting basic broadcast information/SS associated with a beam can be considered to be synonymous with selecting the beam.

In the following description, embodiments 1 and 2 are described. Before describing the embodiments 1 and 2, a basic example as a technology as a premise of the embodiments 1 and 2 is described. Embodiments 1 and 2 are described as improvement measures against the basic example.

Basic Example

<System Whole Configuration>

Figure 1:
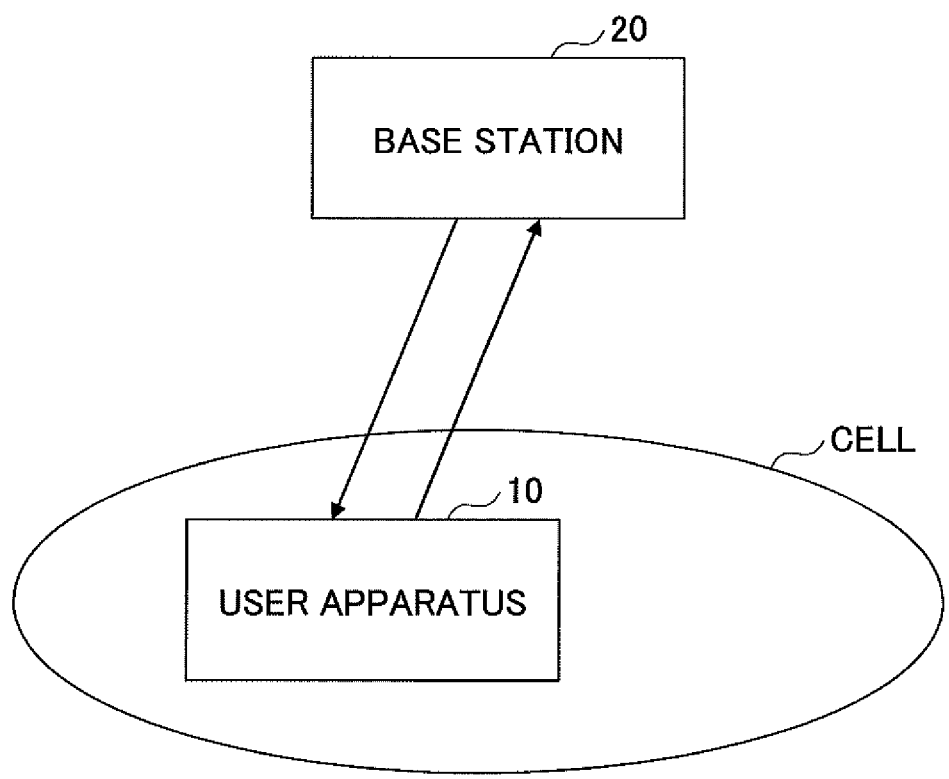
FIG. 1 is a block diagram of a radio communication system in an embodiment of the present invention.

FIG. 1 shows a block diagram of a radio communication system in the present embodiment. The radio communication system of the present embodiment includes a user apparatus 10 and a base station 20 as shown in FIG. 1. In FIG. 1, one user apparatus 10 and one base station 20 are shown, but this is an example and a plurality of user apparatuses 10 and a plurality of base stations 20 may exist.

The user apparatus 10 is a communication apparatus having a radio communication function such as a smartphone, a mobile phone, a tablet, a wearable terminal, a communication module for M2M (Machine-to-Machine), and the like, and the user apparatus 10 connects to the base station 20 by radio to use various communication services provided by the radio communication system. The base station 20 is a communication apparatus that provides one or more cells and performs radio communication with the user apparatus 10. Both of the user apparatus 10 and the base station 20 can perform beamforming to transmit and receive signals.

In the present embodiment, the duplex mode may be TDD (Time Division Duplex) mode or FDD (Frequency Division Duplex) mode.

In the following description, transmitting a signal using a transmission beam is synonymous with sending a signal multiplied by a precoding vector (precoded with a precoding vector). Similarly, receiving a signal using a reception beam is synonymous with multiplying a received signal by a predetermined weight vector. Also, transmitting a signal using a transmission beam may be expressed as sending a signal by using a specific antenna port. Similarly, receiving a signal using a reception beam may be expressed as receiving a signal by using a specific antenna port. Note that an antenna port indicates a logical antenna port defined in the standard of 3GPP. Note that methods for forming the transmission beam and the reception beam are not limited to those described above. For example, a method for changing an angle of each antenna may be used in the user apparatus 10/base station 20 having a plurality of antennas, a method for combining the method using the precoding vector and the method for changing the angle of the antenna may be used, and other methods may be used.

In the following, a beam used for signal transmission from the base station 20 is referred to as a BS transmission beam, a beam used for signal reception by the base station 20 is referred to as a BS reception beam, a beam used for signal transmission from the user apparatus 10 is referred to as a UE transmission beam, and a beam used for signal reception by the user apparatus 10 is referred to as a UE reception beam.

<On Random Access Procedure>

Figure 2:
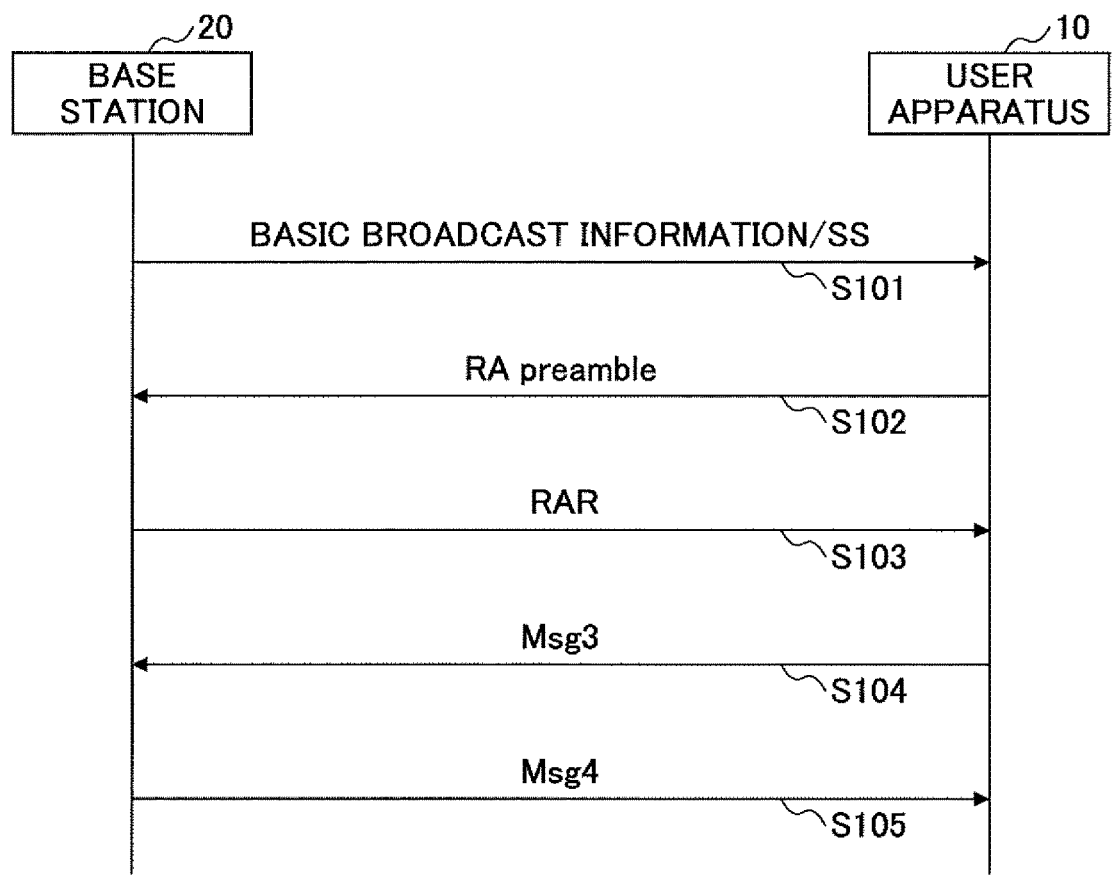
FIG. 2 is a diagram for explaining an example of a random access procedure.

An example of a random access procedure in the present embodiment is described with reference to FIG. 2. In the present embodiment, as an example, a random access procedure similar to the random access procedure in LTE is executed (Non-Patent Document 1). In transmission and reception of signals in the random access procedure, each of the user apparatus 10 and the base station 20 applies a transmission beam and a reception beam. Note that a part of signal transmission and receptions may be omnibus transmission/reception.

The base station 20 performs beam sweeping and transmits basic broadcast information and a synchronization signal (SS: synchronization signal, hereinafter referred to as SS) at predetermined periods respectively for each BS transmission beam (step S101). The transmission periods of the basic broadcast information and the synchronization signal may be the same or may be different. SIB (System Information Block) described later is also transmitted at a predetermined period for each BS transmission beam. SIB may be referred to as "system information". In the basic example, the transmission period of the SIB is longer than the transmission periods of the basic broadcast information and the synchronization signal, and the size of the SIB is greater than the size of any one of the basic broadcast information and the synchronization signal.

Figure 3:
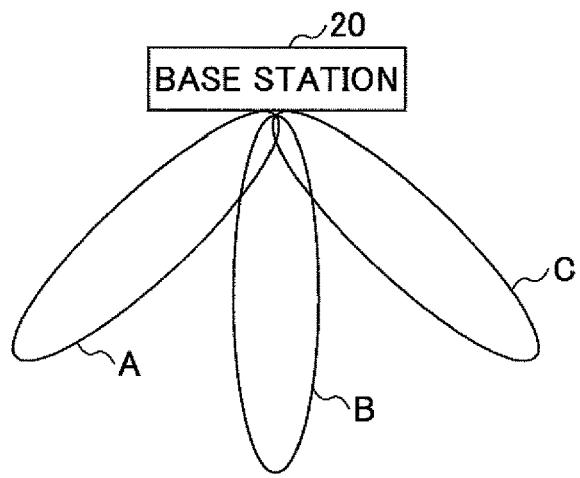
FIG. 3 is a diagram for explaining beams transmitted from the base station 20.

FIG. 3 shows an image of BS transmission beams. In the example of FIG. 3, three transmission beams of A, B and C are shown. In each of the three BS transmission beams, basic broadcast information, a SS, a SIB, and the like are transmitted. In the beam sweeping, for example, BS transmission beams are switched for each time (example: for each symbol).

The basic broadcast information is, for example, basic system information (corresponding to MIB in LTE) transmitted on a PBCH. The SS includes, for example, two types of signals (code sequences) of P-SS and S-SS. The P-SS is a signal for the purpose of symbol timing synchronization, for example, and the S-SS is a signal for the purpose of radio frame synchronization or the like, for example.

By receiving basic broadcast information or a SS or "basic broadcast information and SS" by a BS transmission beam, the user apparatus 10 can identify the BS transmission beam. To identify a BS transmission beam is, for example, to detect an identifier (ID) of the BS transmission beam. An ID of a BS transmission beam may be an antenna port number. For example, an ID of a BS transmission beam may be included in basic broadcast information or may be included in a SS. Also, the ID of the BS transmission beam may be associated with a resource (resource of time and/or frequency) by which the basic broadcast information or the SS is transmitted, so that the user apparatus may identify the BS transmission beam by the resource with which the basic broadcast information or the SS is received.

A block that includes any of P-SS, S-SS and basic broadcast information may be referred to as an SS-block. The user apparatus 10 may assume that to receive an SS block transmitted from the base station 20 (to ascertain content of the SS block) is to identify the BS transmission beam associated with the SS block. In this case, for example, the user apparatus 10 identifies an ID of the BS transmission beam from the content of the received SS block or from the resource with which the SS block is received.

In the case where a resource of a SS block is associated with a BS transmission beam, it is not necessary that the "ID of BS transmission beam" to be identified by the user apparatus 10 is an ID assigned for the BS transmission beam (this is referred to as "beam ID"). For example, a time position (Example: symbol index) of the above SS block is associated with the BS transmission beam and is associated with a RACH resource subset which is a resource used to transmit a RA preamble. In this case, the time position (Example: symbol index) can be considered to be the "ID of BS transmission beam". In this case, it is only necessary for the user apparatus 10 to recognize the time position (Example: symbol index) of the SS block. Also, in this case, for example, the beam ID may be included in the basic broadcast information.

That the resource of the SS block is associated with the BS transmission beam means that, for example, in the case where there are a BS transmission beam A and a BS transmission beam B, the same BS transmission beam A is used at a symbol A and the same BS transmission beam B is used at a symbol B every time at a period of a time unit.

When the resource of the SS block is not associated with the BS transmission beam, for example, the base station 20 includes the beam ID in the basic broadcast information and transmits it, so that the user apparatus 10 identifies the BS transmission beam by reading the beam ID transmitted by the basic broadcast information.

The technique in this embodiment can be applied to either of the above two patterns. In step S102 of FIG. 2, the user apparatus 10 transmits a RA preamble (Message 1) using a resource (which is referred to as a RACH resource subset) corresponding to a BS transmission beam of the basic broadcast information and/or the SS (which is represented as "basic broadcast information/SS") that can be received in step S101.

Upon detecting the RA preamble, the base station 20 transmits a RA response (RAR, Message 2) as a response of the RA preamble to the user apparatus 10 (step S103). The user apparatus 10 that receives the RA response transmits a Message 3 including predetermined information to the base station 20 (step S104). The Message 3 is, for example, an RRC connection request.

The base station 20 that receives the Message 3 transmits a Message 4 (example: RRC connection setup) to the user apparatus 10. After the user apparatus 10 confirms that predetermined information is included in the Message 4, the user apparatus 10 recognizes that the Message 4 is a Message 4 that corresponds to the Message 3 and that is addressed to the user apparatus 10 itself, then the user apparatus 10 completes the random access procedure. On the other hand, when the user apparatus 10 cannot identify the predetermined information in the Message 4, the user apparatus 10 regards it as failure of random access, so that the user apparatus 10 executes the procedure from transmission of a RA preamble again.

<On Transmission Method of RA Preamble>

An example of a transmission method of RA preamble in the step S102 is described in more detail.

In the present embodiment, the user apparatus 10 selects basic broadcast information/SS that can be received among a plurality of pieces of basic broadcast information/SS transmitted by applying beam sweeping from the base station 20. This is the same as selecting a BS transmission beam that transmits the received basic broadcast information/SS. "Received" here means that, for example, it is received with good reception quality, but it is not limited to this.

In the present embodiment, a BS transmission beam from the base station 20 and a RACH resource subset which is a resource to be used for transmitting a RA preamble from the user apparatus 10 are associated with each other. The user apparatus 10 transmits a RA preamble using a RACH resource subset corresponding to a selected BS transmission beam.

Figure 4:
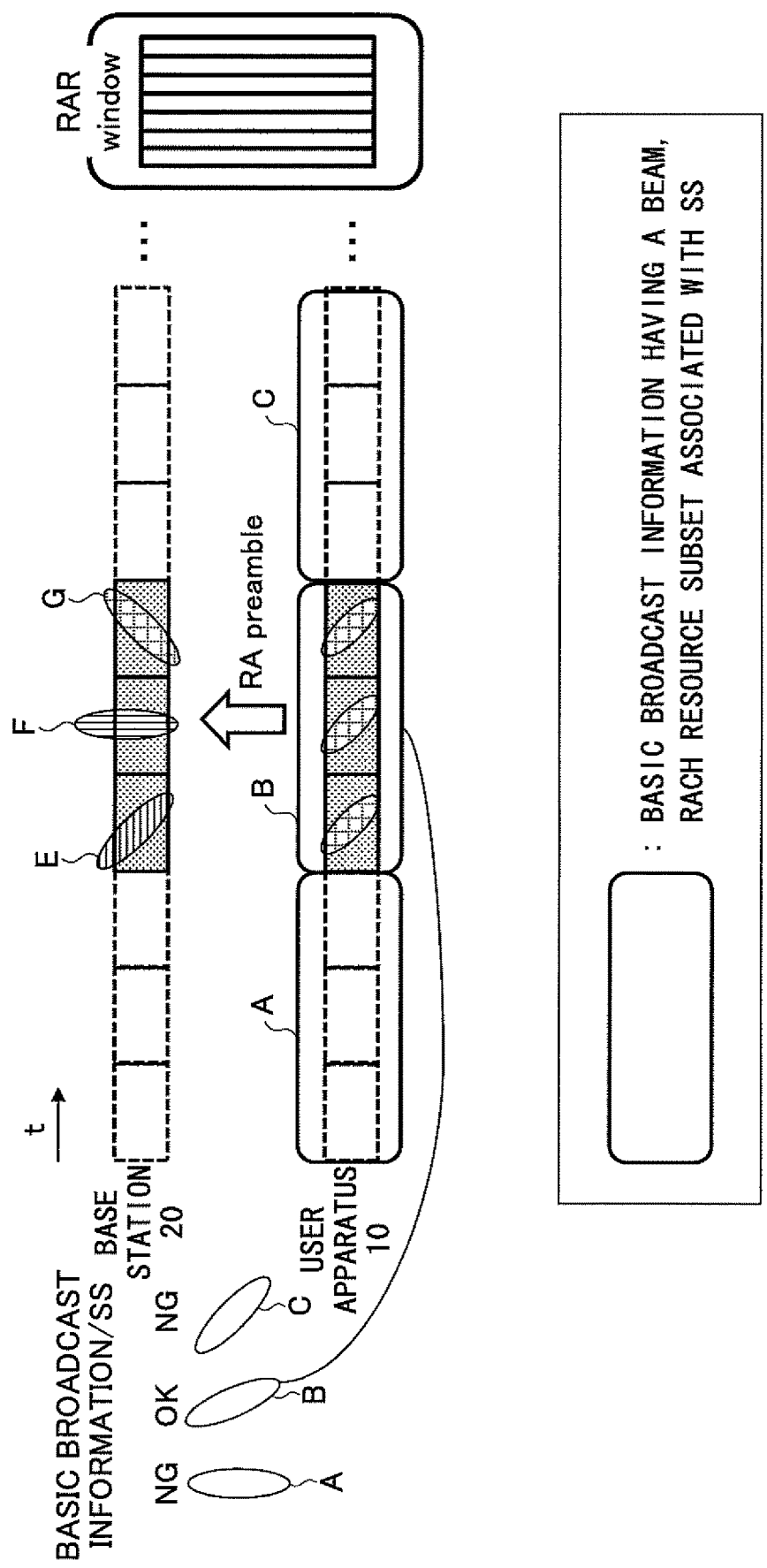
FIG. 4 is a diagram for explaining a transmission method of a RA preamble.

As an example, FIG. 4 shows A, B, and C as RACH resource subsets in the side of the user apparatus 10. The RACH resource subsets A, B, C correspond to the BS transmission beams A, B, C as shown in FIG. 3 respectively, for example. In FIG. 4, a plurality of RACH resource subsets are associated with each BS transmission beam by being divided in the time direction, but this is only an example. A plurality of RACH resource subsets may be associated with each BS transmission beam by being divided in the frequency direction, or a plurality of RACH resource subsets may be associated with each BS transmission beam by being divided in units of time and frequency.

The example of FIG. 4 indicates that the user apparatus 10 can receive basic broadcast information/SS transmitted with the BS transmission beam B, thus, the user apparatus 10 transmits a RA preamble using the RACH resource subset B corresponding to the BS transmission beam B.

Based on a resource of the RA preamble received from the user apparatus 10, the base station 20 can determine basic broadcast information/SS (BS transmission beam) received by the user apparatus 10. In the example of FIG. 4, since the base station 20 receives a RA preamble by the RACH resource subset B, the base station 20 can determine that the BS transmission beam B corresponding to the RACH resource subset B is a proper BS transmission beam that the user apparatus 10 can receive. For example, the base station 20 can use the BS transmission beam B in signal transmission to the user apparatus 10 after that. Note that, in FIG. 4, beams indicated by E, F and G in the base station 20 side indicates BS reception beams, and in this example, as shown in the figure, it is shown that the base station 20 is performing beam sweeping in the reception side.

Also, FIG. 4 shows a RAR window. In the present embodiment, similarly to the existing LTE, when the user apparatus 10 that transmits a RA preamble monitors a RA response, but does not receive the RA response within a predetermined time indicated by the RAR window, it is determined that the random access fails. However, this is an example, and processing different from that of the existing LTE may be performed as processing for determining whether the RA response is successfully received.

The example of FIG. 4 shows a case where the user apparatus 10 can receive the basic broadcast information/SS by using one BS transmission beam. Or the example of FIG. 4 shows a case where the user apparatus 10 can receive the basic broadcast information/SS using a plurality of BS transmission beams, and selects one BS transmission beam that can be received the best (example: reception quality is the best) from the plurality of BS transmission beams.

When the user apparatus 10 receives basic broadcast information/SS by a plurality of BS transmission beams, the user apparatus 10 may transmit RA preambles using a plurality of RACH resource subsets corresponding to the plurality of BS transmission beams respectively. By transmitting the RA preambles by using a plurality of RACH resource subsets, diversity effect can be obtained.

For example, when there are a plurality of BS transmission beams by which the basic broadcast information/SS (or the reference signal) can be received with good reception quality to the same degree, the user apparatus 10 selects the plurality of BS transmission beams, and transmits a RA preamble by each of a plurality of RACH resource subsets corresponding to the plurality of BS transmission beams. Accordingly, the base station 20 may be able to detect a truly optimal BS transmission beam. Also, since it can be considered that UE transmission beams and/or BS reception beams may be different between a plurality of RACH resource subsets, the base station 20 may be able to receive the RA preamble with the optimal beam.

Figure 5:
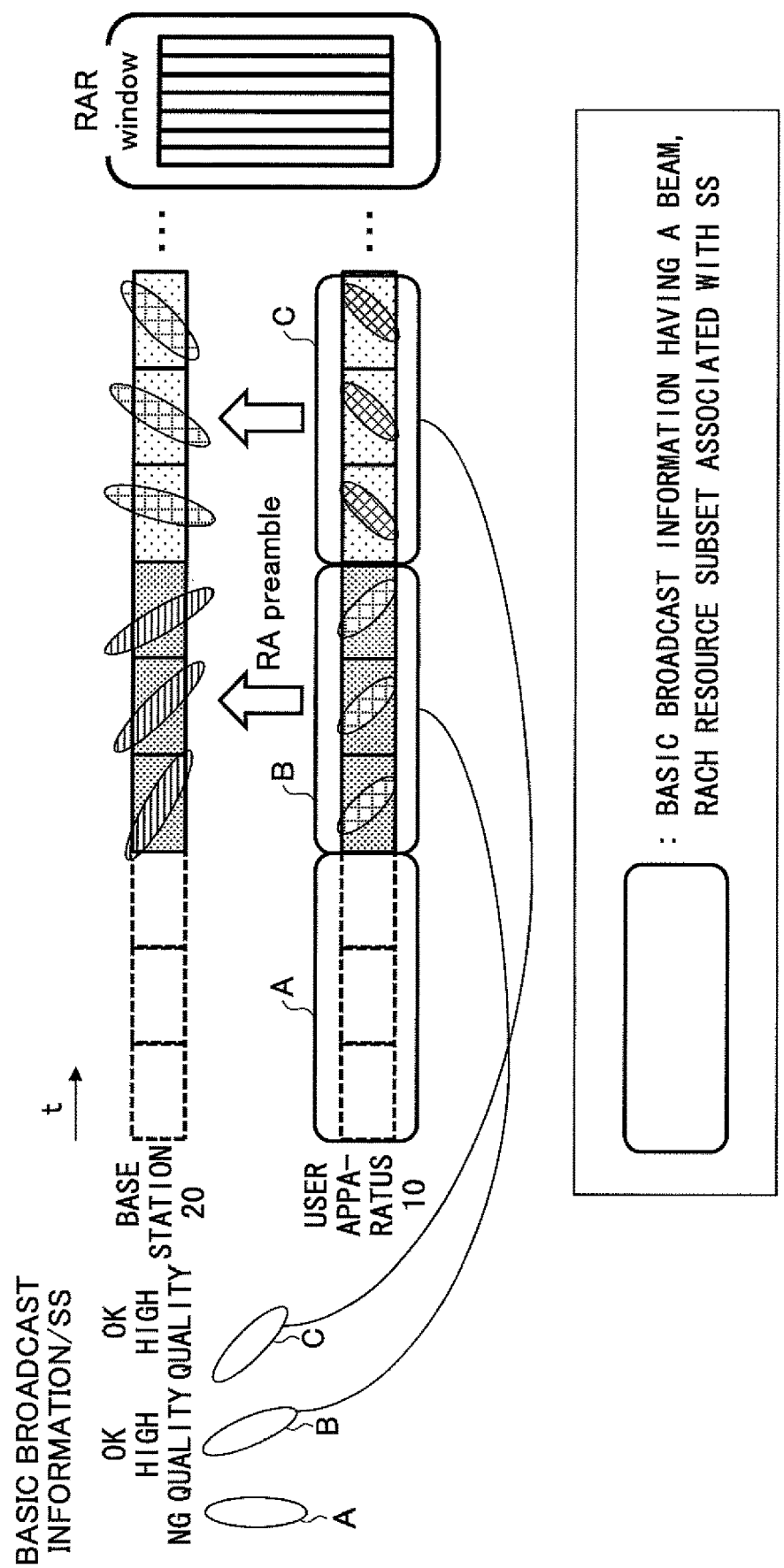
FIG. 5 is a diagram for explaining an operation example in a case in which the user apparatus 10 receives a plurality of pieces of basic broadcast information/SS.

FIG. 5 shows, as an example, a case in which the user apparatus 10 transmits RA preambles using RACH resource subsets B and C corresponding to BS transmission beams B and C. Note that when transmitting a RA preamble in each of a plurality of RACH resource subsets, the content (sequence) of the RA preambles may be the same or different among the plurality of RACH resource subsets.

<On Method for Notifying of RACH Resource Subsets>

In the present embodiment, the base station 20 transmits information indicating a RACH resource subset corresponding to a BS transmission beam to the user apparatus 10. Based on the information, the user apparatus 10 can know a RACH resource subset corresponding to a BS transmission beam of received basic broadcast information/SS. As an example, in the case in which the user apparatus 10 receives from the base station 20 information indicating a RACH resource subset A as a RACH resource subset corresponding to a BS transmission beam A, if the user apparatus 10 selects the BS transmission beam A to transmit a RA preamble, the user apparatus 10 transmits the RA preamble using the RACH resource subset A.

"Information indicating a RACH resource subset" notified from the base station 20 to the user apparatus 10 may be information indicating a time/frequency resource of the RACH resource subset (example: a resource index), or information indicating a time resource of the RACH resource subset (time position), or may be other information.

For example, the above information is notified, for each BS transmission beam, using a SIB transmitted by the BS transmission beam. Also, in a SIB transmitted by a BS transmission beam, information of a RACH resource subset corresponding to another BS transmission beam may be included.

<On Transmitting a Plurality of RA Preambles>

From the viewpoint of quickly connecting to the base station 20, it can be considered that the user apparatus 10 freely transmits a plurality of RA preambles using the RACH resource subsets associated with each of the plurality of basic broadcast information/SS that can be detected. However, in that case, there is a possibility in that the user apparatus 10 transmits the RA preamble using the RACH resource subset associated with the basic broadcast information/SS that cannot be received with an appropriate reception quality.

For example, if the user apparatus 10 receives two SSs and there is a large difference in reception quality between them, the probability that the RA preamble transmitted in the RACH resource subset corresponding to the SS of bad reception quality is successfully received by the base station 20 side is low. Also, the probability that the RA preamble is not useful is high from the viewpoint of appropriateness of UE transmission beam and BS reception beam. Also, by performing RA preamble transmission which is not useful as described above, it will spread interference to the surroundings. Further, if the RA preamble corresponding to the worse reception quality is received by the base station 20 and the subsequent processing is also continued, the possibility that the BS transmission beam is not appropriate is high, so that there is a possibility that the performance of the subsequent communication deteriorates.

In particular, the effect is more conspicuous in cases where there is BS/UE beam correspondence, that is, the channel reciprocity is available on the BS/UE side.

Outline of Embodiments

Therefore, in the embodiments described below, a threshold related to the reception quality of the BS transmission beam is provided. Basically, when the reception quality of the BS transmission beam in the user apparatus 10 is better than the threshold, a RA preamble is transmitted using the RACH resource subset associated with the BS transmission beam.

The reception quality is not limited to a particular one. For example, the reception quality is received power of a desired signal received from the base station 20 by the user apparatus 10, a ratio of interference and the received power (received power/interference, so-called SNR), or a ratio of "interferences+noise" and received power (received power/ (interference+noise), so-called SINR). Also, the received quality may be a pathloss related to the BS transmission beam. The above desired signal is, for example, basic broadcast information/SS, a reference signal, or a data signal transmitted by the target BS transmission beam.

As described above, when using the received power or a value having the received power as numerator as a reception quality, if the value of the reception quality is large, the reception quality is good. On the other hand, when using the pathloss as the reception quality, if the value of the pathloss is small, the reception quality is good. That is, depending on the type of the reception quality for use, there are a case in which the greater (the value) the reception quality is, the better the reception quality is, and a case in which the smaller (the value) the reception quality is, the better the reception quality is.

In this embodiment, "greater than" or "smaller than" may be replaced with "greater than or equal to" and "smaller than or equal to".

Hereinafter, for convenience of explanation, the reception quality is described as being better as the value is greater like the received power, for example. As to reception quality that becomes better as the value becomes smaller, "greater than" in the following explanation may be replaced with "smaller than". Also, In some cases, the expression "reception quality is better than the threshold" is used as an expression that includes these.

In the following, various examples using a threshold are described as an embodiment 1. Also, variations related to RAR window based on the embodiment 1 is described as an embodiment 2. In the explanation of embodiments 1 and 2, improvement parts (that is, the change parts) of the technique of the basic example described so far are described, and therefore, in the case where explanation is not particularly given, the basic example is applied basically.

Embodiment 1

As described above, in the present embodiment, a threshold on the reception quality of the BS transmission beam is provided, and basically, when the reception quality of the BS transmission beam in the user apparatus 10 satisfies a predetermined condition, the user apparatus 10 transmits a RA preamble using a RACH resource subset associated with the BS transmission beam (basic broadcast information/SS). Specific examples of the predetermined conditions are described below, but the predetermined conditions are not limited to the following examples.

As an example, the predetermined condition is that the reception quality is greater than a threshold. For example, in the case in which the threshold is TH, if the reception quality X in the BS transmission beam B shown in FIG. 5 is above TH and the reception quality Y in the BS transmission beam C is smaller than TH, the user apparatus 10 transmits a RA preamble using a RACH resource subset associated with the BS transmission beam B.

For example, the user apparatus 10 applies the above threshold to all detected BS transmission beams. Also, the user apparatus 10 may apply the threshold only for the BS transmission beams of reception quality after the N-th best reception quality by arranging reception qualities of the detected plurality of BS transmission beams in descending order of goodness of reception quality. For example, in the example of FIG. 5 described above, if X>Y and N is 2, the user apparatus 10 applies the threshold only to the BS transmission beam C. That is, the user apparatus 10 applies the threshold only for the second best BS transmission beam C.

Also, the threshold may be different for each BS transmission beam. For example, in the example of FIG. 5, TH1 is used for the reception quality X in the BS transmission beam B, and TH2 is used for the reception quality X in the BS transmission beam C. When using different thresholds for each BS transmission beam, for example, the greater the reception quality is, the greater the threshold value for use is.

The threshold may be a value (which is referred to as "direct comparison threshold") directly used for comparison with the reception quality as mentioned above, or may be a relative value (which is referred to as "relative threshold"). As to the threshold as the relative value, for example, the user apparatus 10 compares the relative threshold with a difference that is obtained by subtracting the reception quality in the BS transmission beam of determination target from the greatest reception quality in reception qualities of the plurality of BS transmission beams, and when the difference is smaller than the relative threshold, the user apparatus 10 determines that the user apparatus 10 can transmit the RA preamble by using the RACH resource subset associated with the BS transmission beam of the determination target.

Figure 6:
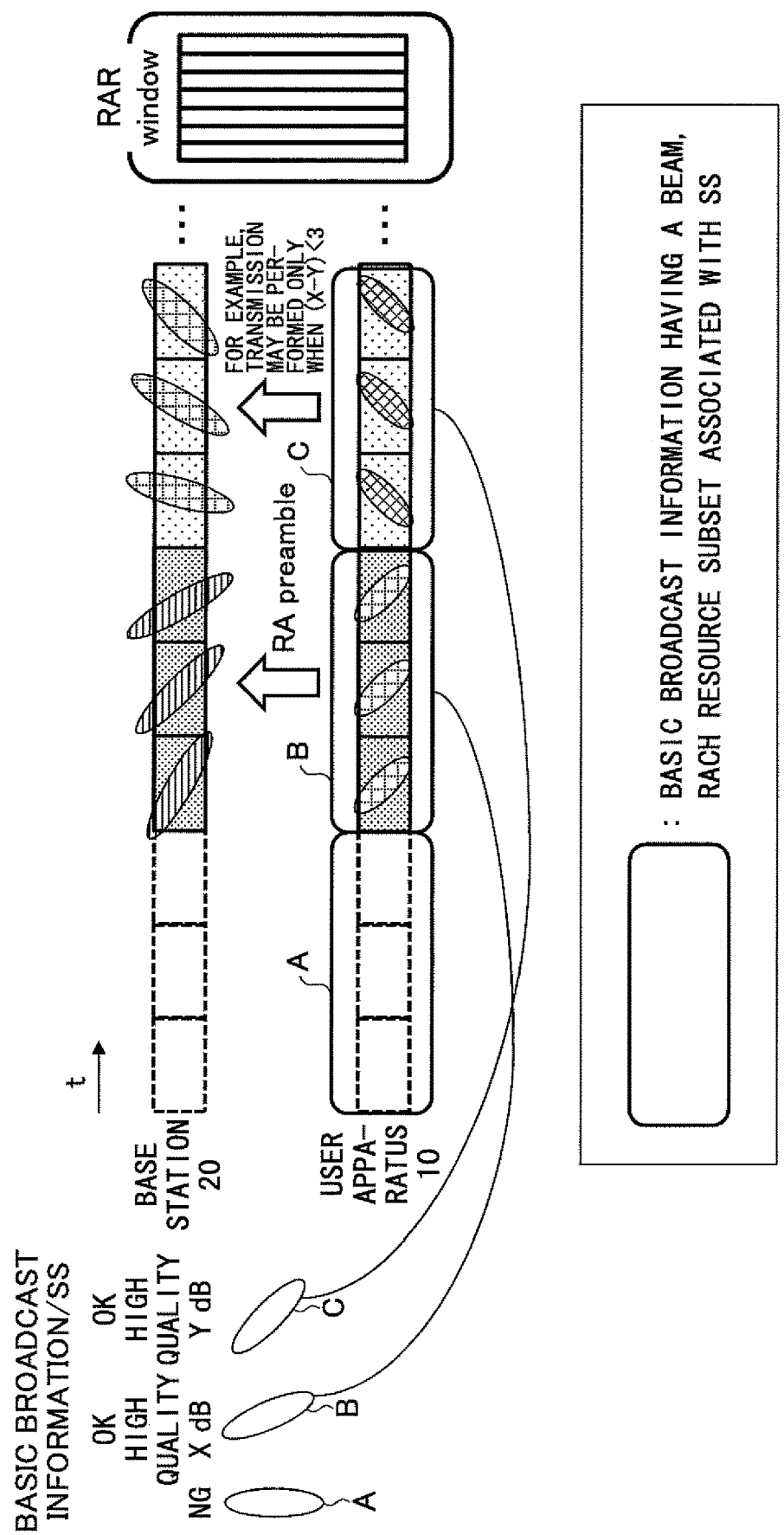
FIG. 6 is a diagram for explaining an embodiment 1.

An example of this case is described with reference to FIG. 6. In the example of FIG. 6, the relative threshold is 3. For example, the user apparatus 10 measures a reception quality of basic broadcast information/SS transmitted by the BS transmission beam B as X, and measures a reception quality of basic broadcast information/SS transmitted by the BS transmission beam C as Y. Since X>Y is satisfied, the reception quality of the basic broadcast information/SS transmitted by the BS transmission beam B is the greatest. The user apparatus 10 transmits a RA preamble using a RACH resource subset associated with the BS transmission beam B. Also, the user apparatus 10 compares (X−Y) with 3, and if (X−Y)<3 is satisfied, the user apparatus 10 transmits a RA preamble using the RACH resource subset associated with the BS transmission beam C.

In the above example, the direct comparison threshold may be applied for the first RA preamble.

An upper limit value may be set for the number of RA preambles that can be sent simultaneously (that is, the number of concurrently available RACH resource subsets). Note that "simultaneous" means a time interval that can be regarded as "simultaneous".

For example, in the case in which the direct comparison threshold is used, when 3 is given as an upper limit value, even if there are four BS transmission beams whose reception quality is greater than the direct comparison threshold, the number of RA preambles that can be simultaneously transmitted is three. In this case, for example, a RA preamble for a BS transmission beam of the worst reception quality among the four is not transmitted.

Also, for example, in the case of using the relative threshold described with reference to FIG. 6, it is assumed that there are N BS transmission beams (including BS transmission beam of the greatest reception quality) having reception quality between the greatest reception quality and (greatest reception quality—relative threshold). If there is no upper limit value, or the upper limit value is greater than N, N RA preambles are transmitted. On the other hand, for example, if the upper limit value is M(<N), M RA preambles are transmitted.

<As to Threshold>

The above-mentioned threshold (direct comparison threshold, relative threshold) is, for example, notified by a DCI, a MAC signal, a RRC signal and the like from the base station 20 to the user apparatus 10. Or, the threshold may be preconfigured in the base station 20 and the user apparatus 10.

Figure 7:
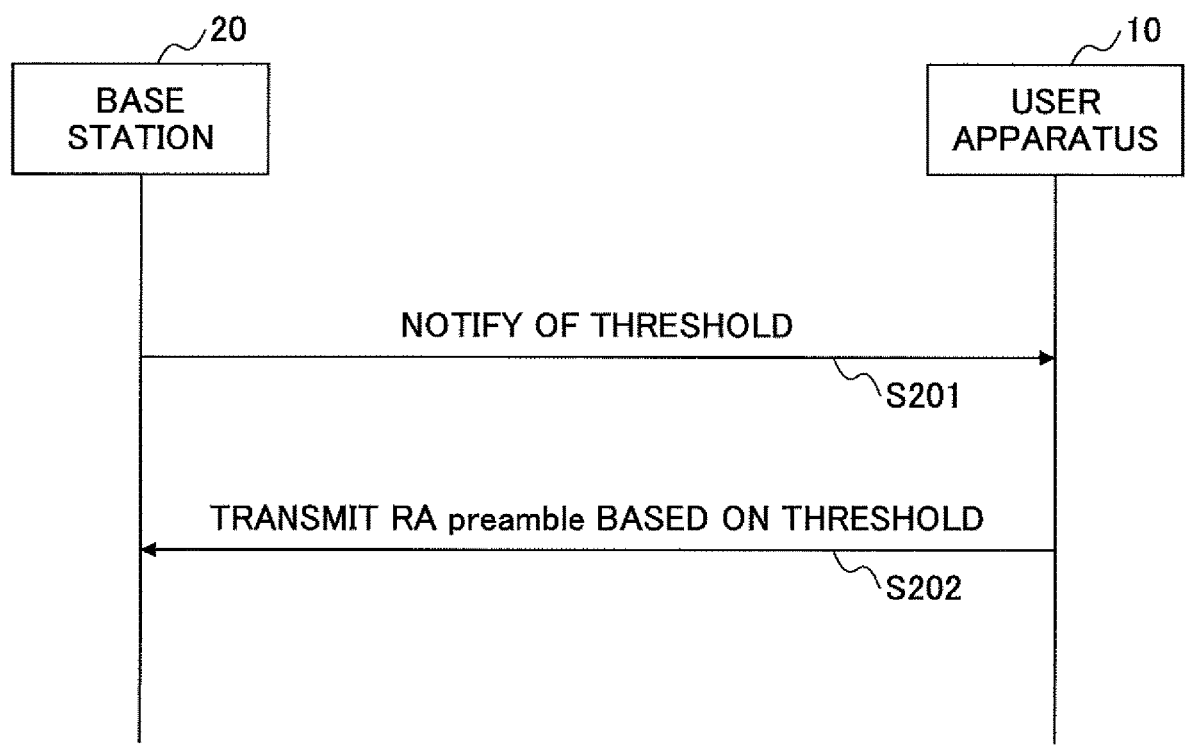
FIG. 7 is a sequence diagram for transmitting a threshold from the base station 20 to the user apparatus 10.

FIG. 7 shows a sequence diagram when transmitting the threshold from the base station 20 to the user apparatus 10. As shown in FIG. 7, the base station 20 transmits the threshold to the user apparatus 10 (step S201). The user apparatus 10 holds the threshold in a storage unit such as a memory. Also, the user apparatus 10 determines availability of transmission of RA preamble for basic broadcast information/SS (BS transmission beam) that can be received by using reception quality in the BS transmission beam and the threshold, and if the transmission is available, the user apparatus 10 performs transmission (step S202).

<Application of Threshold on Retransmission>

In the present embodiment, like the existing LTE, a RAR window (time window) is provided. After transmitting a RA preamble, the user apparatus 10 monitors a RAR (RACH response) in the RAR window. More specifically, the user apparatus 10 performs blind decoding using a RA-RNTI.

After transmitting a RA preamble, if the user apparatus 10 does not receive a RAR corresponding to the RA preamble within the RAR window, the user apparatus 10 performs retransmission of the RA preamble.

As to the threshold already described, it may be applied by the same method for initial transmission and retransmission (including retransmission on or after second retransmission) of a RA preamble. The user apparatus 10 may transmit a RA preamble without applying a threshold in the initial transmission, and may apply the threshold in the retransmission. Also, the user apparatus 10 may not apply the threshold for RA preambles up to N-th transmission (N is an integer equal to or greater than 1) including initial transmission, and may apply a threshold when determining transmission of the RA preamble after (N+1)-th transmission (including (N+1)-th transmission). Also, the user apparatus 10 may apply the threshold for RA preambles up to N-th transmission (N is an integer equal to or greater than 1) including initial transmission, and may not apply a threshold when determining transmission of RA preamble after (N+1)-th transmission (including (N+1)-th transmission). For example, when N=1, the threshold is applied in the initial transmission, and the threshold is not applied in retransmission after that.

The above N is, for example, notified by a DCI, a MAC signal, a RRC signal and the like from the base station 20 to the user apparatus 10. Or, the N may be preconfigured in the base station 20 and the user apparatus 10.

As to the reception quality, a reception quality measured at a timing when a RA preamble is transmitted (just before transmission in fact) may be used, or, when the time interval between initial transmission (or previous retransmission) and retransmission is short, a reception quality measured in the initial transmission (or previous retransmission) may be used for determination of retransmission.

Figure 8:
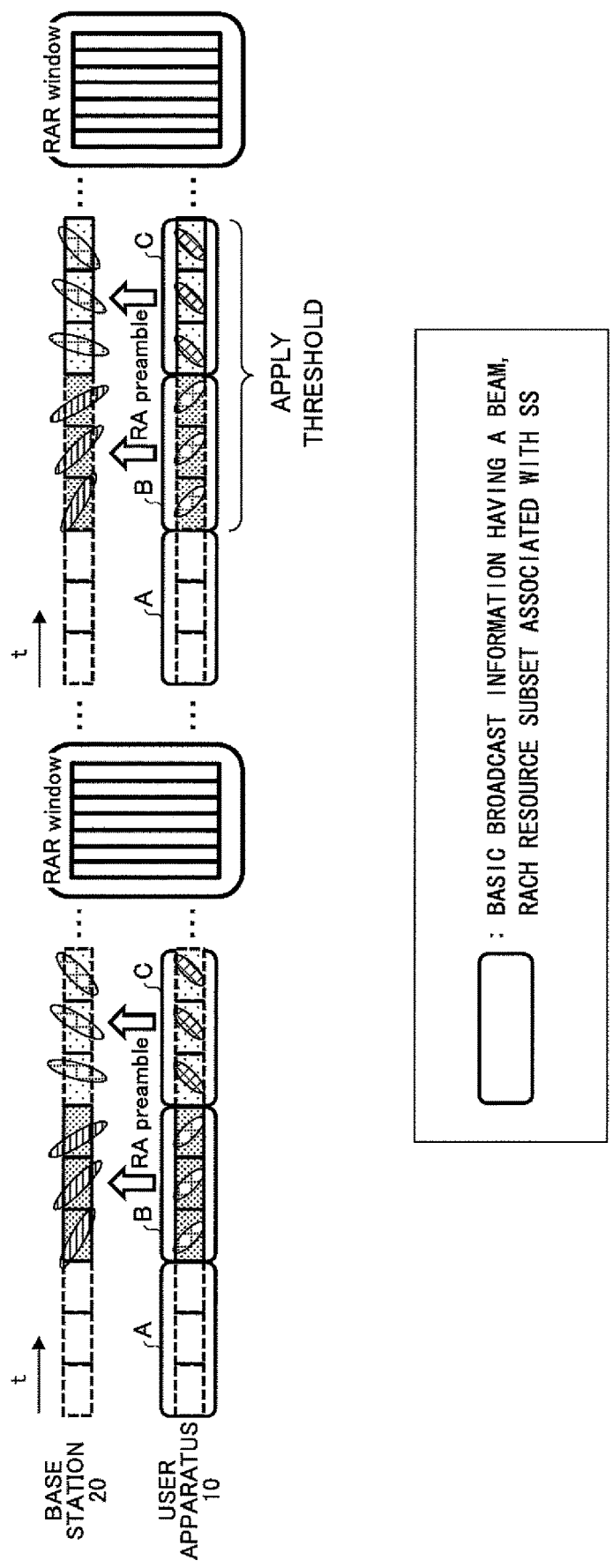
FIG. 8 is a diagram for explaining an application method of a threshold.

The example shown in FIG. 8 shows the case when N=1. As shown in FIG. 8, the user apparatus 10 applies the threshold when performing first retransmission without applying the threshold in initial transmission.

When performing retransmission, there is a case where the user apparatus 10 transmits a RA preamble using a RACH resource subset different from a RACH resource subset for initial transmission (or previous retransmission). For example, at the time of initial transmission, the user apparatus 10 transmits the RA preamble using a RACH resource subset corresponding to the BS transmission beam A as one of the detected BS transmission beams, however, since the RAR cannot be received, the user apparatus 10 transmits a RA preamble using a RACH resource subset corresponding to the BS transmission beam B, which is another beam among the plurality of detected BS transmission beams in retransmission. In such a case, the user apparatus 10 may determine, by using a threshold, whether to change RACH resource subsets between RA preamble transmission and next RA preamble transmission as retransmission for the RA preamble transmission.

Figure 9:
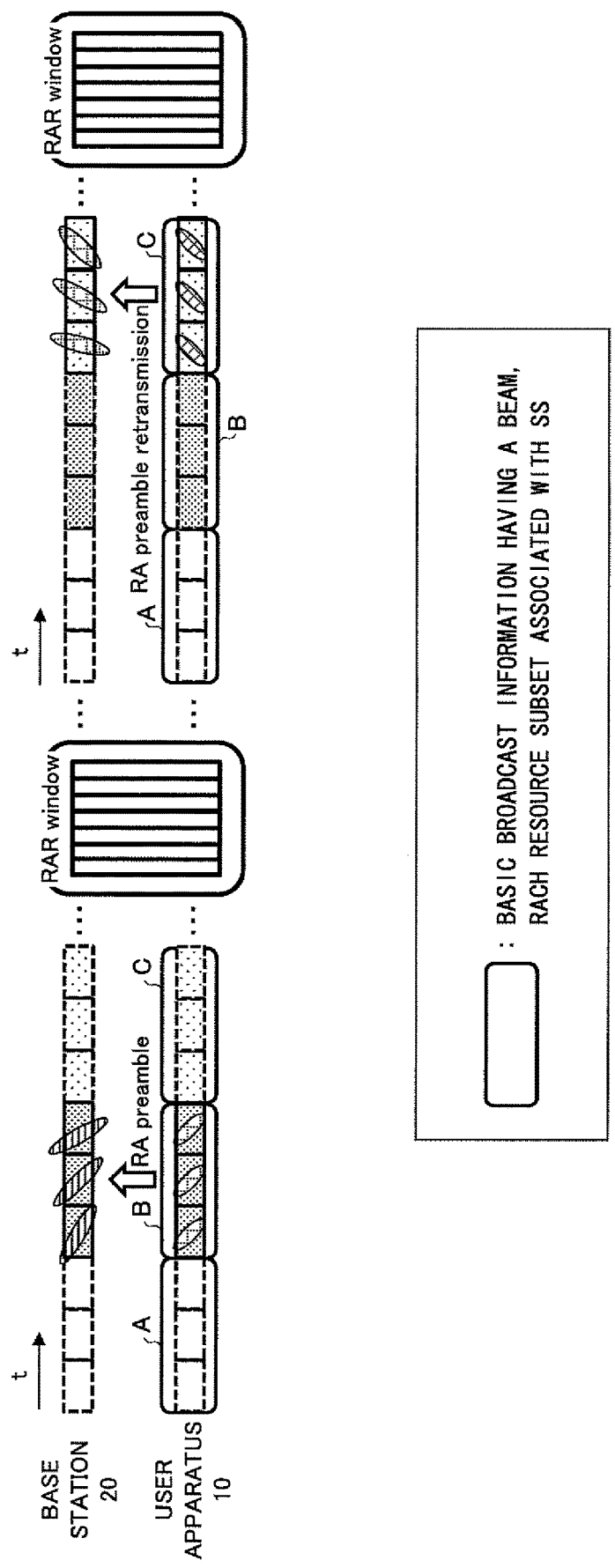
FIG. 9 is a diagram for explaining an example in the case in which a threshold is applied in retransmission.

A specific example is described with reference to FIG. 9. First, a case in which the direct comparison threshold TH is used is described. For example, by detecting that a reception quality in the BS transmission beam B is greater than TH, the user apparatus 10 transmits (initial transmission) a RA preamble using the RACH resource subset B associated with the BS transmission beam B (initial transmission).

The user apparatus 10 decides to retransmit a RA preamble using another RACH resource subset because it has sent a RA preamble using RACH resource subset B but did not receive the RAR in the RAR window. In this case, for example, the user apparatus 10 detects the BS transmission beam C as a BS transmission beam with reception quality above TH, other than the BS transmission beam B. More specifically, for example, the user apparatus 10 detects that basic broadcast/SS associated with the BS transmission beam C can be received with reception quality greater than TH. Then, the user apparatus 10 retransmits a RA preamble using the RACH resource subset C associated with the BS transmission beam C.

Next, a case in which the relative threshold RTH is used is described. The user apparatus 10 decides to retransmit the RA preamble using another RACH resource subset because it has sent the RA preamble using RACH resource subset B corresponding to the BS transmission beam B but did not receive the RAR in the RAR window.

Here, it is assumed that the reception quality in the BS transmission beam B is B. For example, the user apparatus 10 detects the BS transmission beam C as a BS transmission beam whose reception quality is greater than (B-RTH). Then, the user apparatus 10 retransmits a RA preamble using the RACH resource subset C associated with the BS transmission beam C.

As described above, in this embodiment, since the transmission of the RA preamble is limited by using the threshold, possibility of improper beam selection that may occur by transmitting a RA preamble using a RACH resource subset corresponding to a BS transmission beam whose reception quality is not good can be decreased, and interference to surroundings can be decreased.

Embodiment 2

Next, an embodiment 2 is described. The embodiment 2 is based on the premise of the embodiment 1 (transmission restriction of RA preamble using threshold). However, it is not necessary to assume that the embodiment 1 is a prerequisite, and only the basic example can be assumed. In the embodiment 2, a setting example of RAR window is described. In the following, an embodiment 2-1 and an embodiment 2-2 are described.

Embodiment 2-1

In the embodiment 2-1, a RAR window is configured for each of a plurality of RACH resource subsets corresponding to different BS transmission beams.

Figure 10:
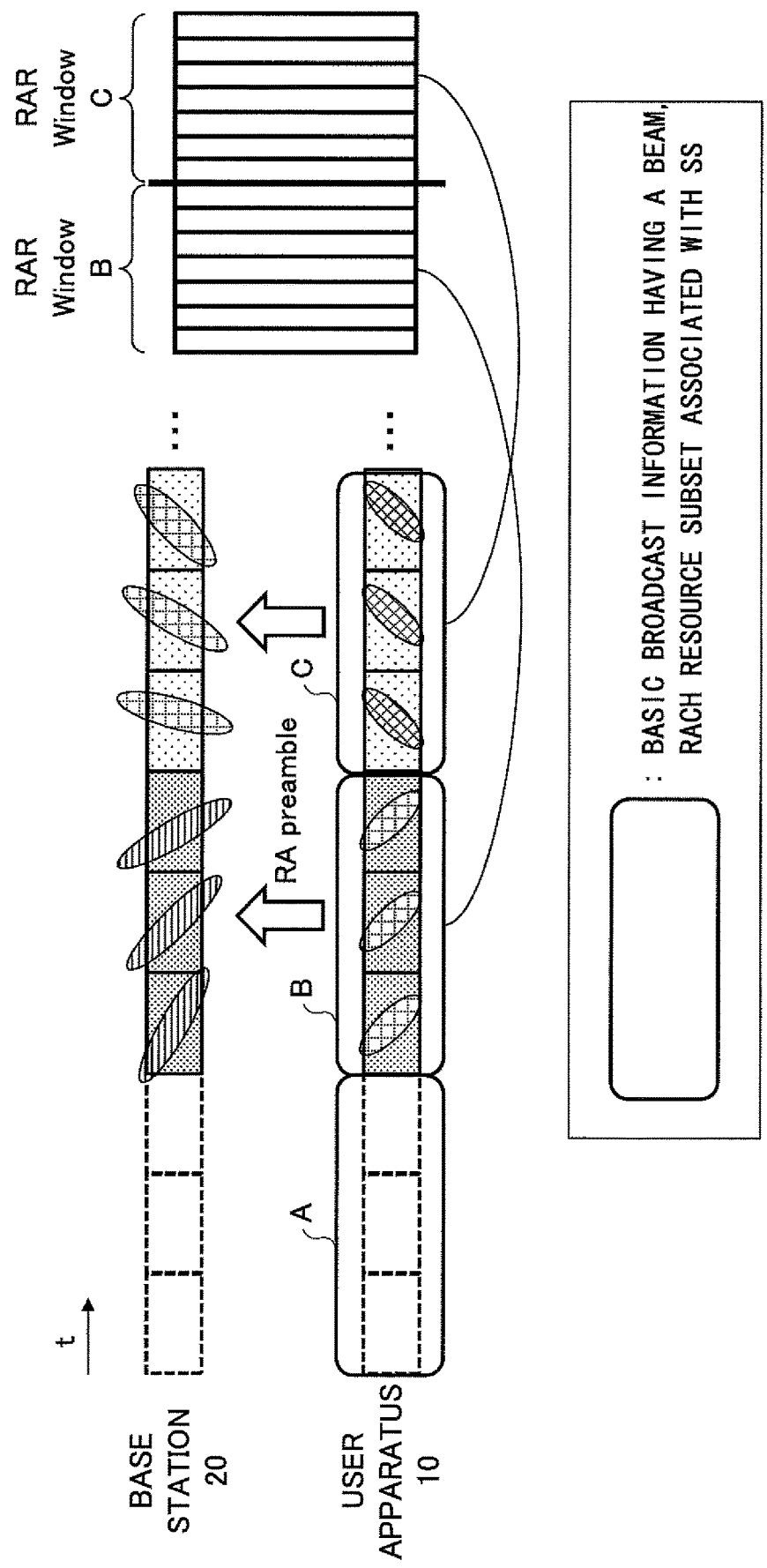
FIG. 10 is a diagram for explaining an example in the case in which the RAR window is divided in the time direction in the embodiment 2.

FIG. 10 shows an example of a case in which RAR windows for each of a plurality of RACH resource subsets are configured by dividing a RAR window in the time direction. In the case of FIG. 10, a RAR window B is configured for the RACH resource subset B by which a RA preamble is transmitted, and a RAR window C is configured for the RACH resource subset C by which a RA preamble is transmitted.

For example, by setting, in the user apparatus 10, a time length (to be referred to as "offset" for convenience sake) from the timing (time) when the RA preamble is transmitted to a start timing (time) of the RAR window corresponding to the RACH resource subset by which the RA preamble is transmitted, and a time length (to be referred to as "window time length" for convenience sake) of the RAR window, the user apparatus 10 can determine the RAR window corresponding to the RA preamble based on the offset and the window time length. Also, the base station 20 holds the offset and the window time length, so that the base station 20 can specify the RAR window that is used by the user apparatus 10 based on the timing at which the RA preamble is received.

The above-mentioned offset and the window time length may be notified by a DCI, a MAC signal, a RRC signal and the like from the base station 20 to the user apparatus 10, or, may be preconfigured in the base station 20 and the user apparatus 10.

Figure 11:
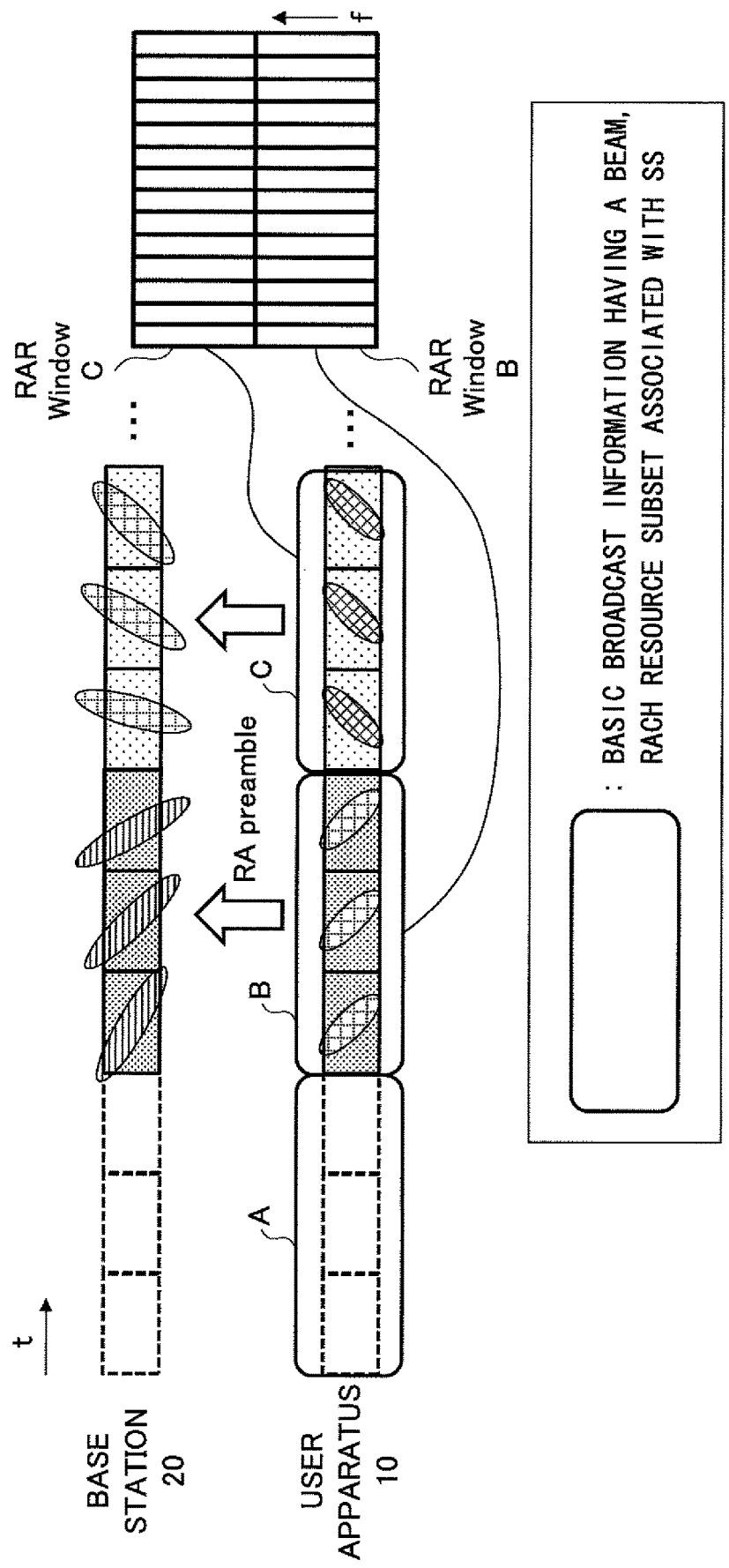
FIG. 11 is a diagram for explaining an example in the case in which the RAR window is divided in the frequency direction in the embodiment 2.

FIG. 11 shows an example of a case in which RAR windows for each of a plurality of RACH resource subsets are configured by dividing a RAR window in the frequency direction. In the case of FIG. 11, a RAR window B is configured for the RACH resource subset B by which a RA preamble is transmitted, and a RAR window C is configured for the RACH resource subset C by which a RA preamble is transmitted.

For example, by setting, in the user apparatus 10, correspondence relationship between RA preamble transmission timing and a frequency position (example: center frequency and width), the user apparatus 10 can determine the RAR window based on the timing when transmitting the RA preamble and the correspondence relationship. As to the position (start timing and time length) of the RAR window in the time direction, for example, a start timing and the time length with respect to a predetermined number of RACH resource subsets (example: three RACH resource subsets A, B and C shown in FIG. 11) are fixedly determined for the predetermined number of RACH resource subsets as common values, so that they are used. Or, the method described with reference to FIG. 10 may be applied for the time direction in the method shown in FIG. 11.

The information indicating the correspondence relationship between the RA preamble transmission timing and the frequency position may be notified by a DCI, a MAC signal, a RRC signal and the like from the base station 20 to the user apparatus 10, or, may be preconfigured in the base station 20 and the user apparatus 10.

In the embodiment 2-1, for example, a plurality of RAR windows corresponding to a plurality of RA preamble transmissions are configured such that they do not overlap. Accordingly, the user apparatus 10 can determine that which RACH resource subset (that is, which BS transmission beam) the received RAR corresponds to based on the RAR window in which the RAR is received. As described above, by configuring the plurality of RAR windows corresponding to the plurality of RA preamble transmissions such that they do not overlap, transmission of after-mentioned identifier is unnecessary, so that the signaling amount can be reduced.

In the embodiment 2-1, it may be permitted that the plurality of RAR windows corresponding to the plurality of RA preamble transmissions overlap. In this case, for example, the base station 20 includes, within the RAR or RA-RNTI (identifier indicating that the transmission signal is a RAR), an identifier for identifying which RACH resource subset (that is, which BS transmission beam) the RAR corresponds to. The identifier is, for example, an index for identifying basic broadcast information/SS, or an index for identifying the RACH resource subset. For example, when there is an overlapping time width between a RAR window-A and a RAR window-B, even if the user apparatus 10 receives a RAR in the overlapping time width, the user apparatus 10 can determine which RACH resource subset the RAR corresponds to by the above identifier. By allowing overlapping in this way, the whole time length of the RAR window can be shortened, so that delay can be reduced.

Embodiment 2-2

Figure 12:
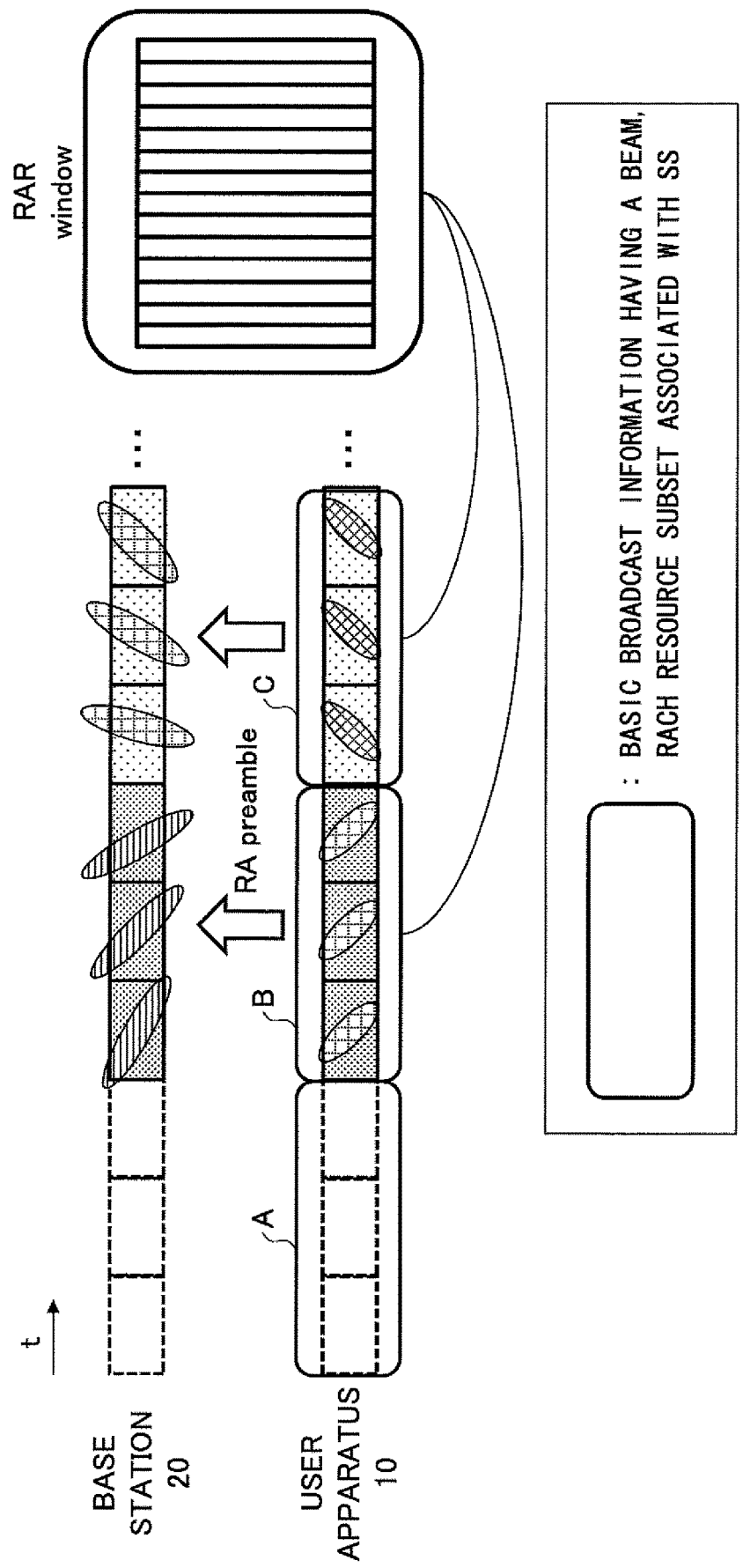
FIG. 12 is a diagram for explaining the case in which a common RAR window is used in the embodiment 2.

As shown in FIG. 12, in the embodiment 2-2, one RAR window is configured commonly to a plurality of RACH resource subsets corresponding to different BS transmission beams. For example, one RAR window is configured commonly for N (N is an integer equal to or greater than 1) RACH resource subsets. The value of N may be notified by a DCI, a MAC signal, a RRC signal and the like from the base station 20 to the user apparatus 10, may be preconfigured in the base station 20 and the user apparatus 10, or may be determined to be a value the same as a value (example: the number of BS transmission beams).

Also, for example, when the user apparatus 10 transmits a RA preamble using at least one RACH resource subset in N consecutive RACH resource subsets, the user apparatus 10 monitors a RAR in the (common) RAR window corresponding to the N RACH resource subsets.

For example, as to a RA window for N RACH resource subsets, by setting, in the user apparatus 10, a time length (to be referred to as "offset" for convenience sake) from the end of the N RACH resource subsets in the time direction to a start timing (time) of the RAR window, and a time length (to be referred to as "window time length" for convenience sake) of the RAR window, the user apparatus 10 can determine the RAR window based on the offset and the window time length. Also, the base station 20 holds the offset and the window time length, so that the base station 20 can specify the RAR window that is used by the user apparatus 10 based on the timing at which the RA preamble is received.

The above-mentioned offset and the window time length may be notified by a DCI, a MAC signal, a RRC signal and the like from the base station 20 to the user apparatus 10, or, may be preconfigured in the base station 20 and the user apparatus 10.

In the embodiment 2-2, one RAR window common to a plurality of RACH resource subsets is used, thus, for example, the base station 20 includes, within the RAR or RA-RNTI, an identifier for identifying which RACH resource subset (that is, which BS transmission beam) the RAR corresponds to. The identifier is, for example, an index for identifying basic broadcast information/SS, or an index for identifying the RACH resource subset. For example, even when the user apparatus 10 receives a RAR in one RAR window common to a plurality of RACH resource subsets, the user apparatus 10 can determine which RACH resource subset the RAR corresponds to.

Also, the order of the RACH resource subsets may be associated with the order of RARs within the RA window. For example, as shown in FIG. 12, in the case in which the user apparatus 10 transmits a RA preamble using the RACH resource subset B, and next, transmits a RA preamble using the RACH resource subset C, the user apparatus 10 determines that a RAR received first in the RAR window common to these RACH resource subsets is the RAR corresponding to the RACH resource subset B, and determines that a RAR received next to be a RAR corresponding to the RACH resource subset C.

In the above example, one RAR window is configured commonly for a plurality of RACH resource subsets. However, the technique is not limited to this. A common RAR window may be configured for a plurality of RACH resources used for RA preamble transmission by the user apparatus 10 among individual RACH resources included in a RACH resource subset. This is explained with reference to FIG. 12. For example, in a case where transmission of two RA preambles is performed using two RACH resources among a plurality of individual RACH resources included in the RACH resource subset indicated by B, one common RAR window is configured commonly for the transmission of the two RA preambles.

Also, in a case where one common RAR window is configured for a plurality of RACH resources used for RA preamble transmission, for example, the base station 20 includes an identifier in a RAR or a RA-RNTI, for identifying which RACH resource the RAR corresponds to.

Like the embodiment 2-2, by using the RAR window common to a plurality of RACH resource subsets, the whole time length of the RAR window can be decreased, so that delay can be eliminated.

(Apparatus Configuration)

Next, an example of the functional configurations of the user apparatus 10 and the base station 20 performing the above-mentioned operations described so far are described below. Each of the user apparatus 10 and the base station 20 includes at least functions for implementing the embodiments 1 and 2. However, each of the user apparatus 10 and the base station 20 may include only a part of functions in the embodiments 1 and 2.

<User Apparatus>

Figure 13:
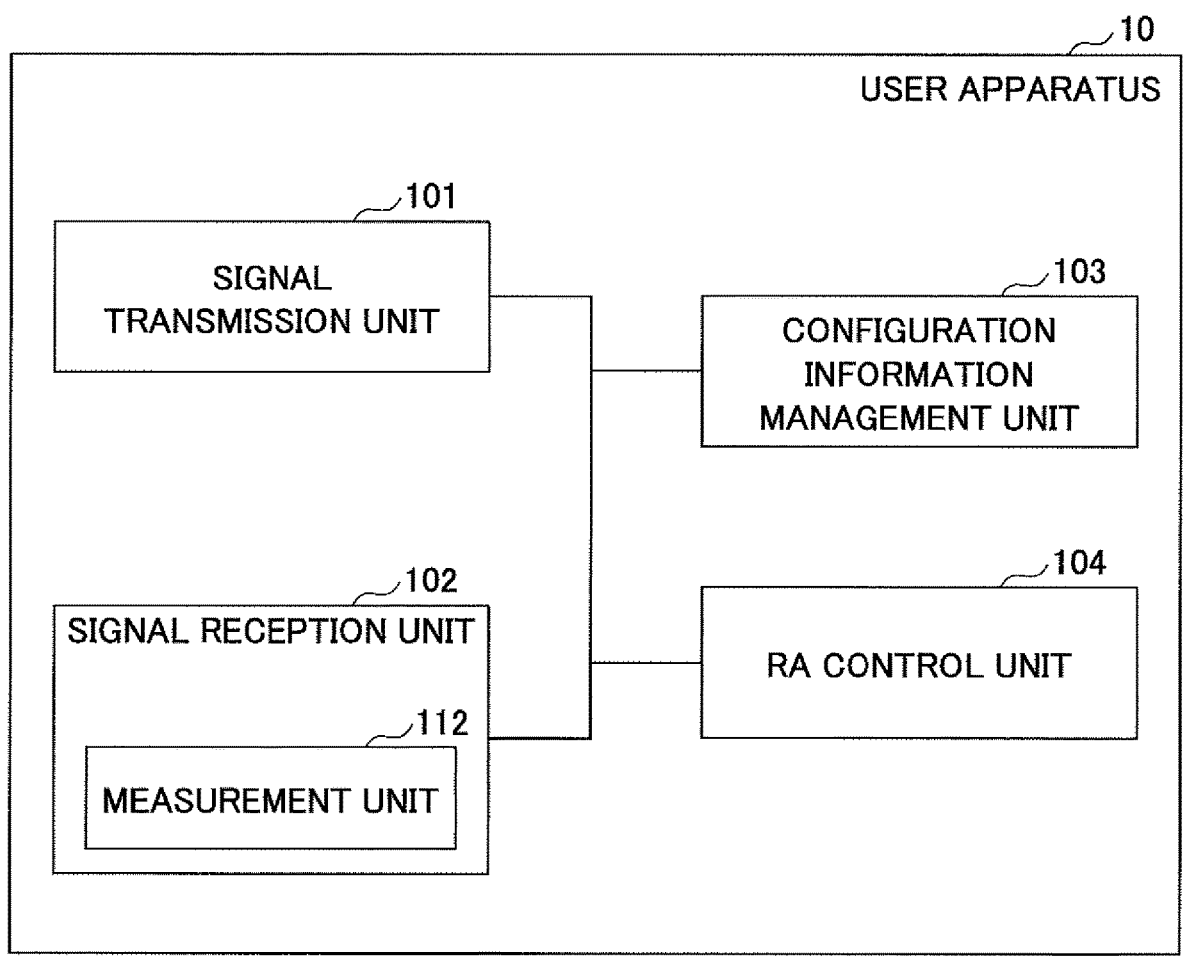
FIG. 13 is a diagram showing an example of a functional configuration of the user apparatus 10.

FIG. 13 is a diagram illustrating an example of a functional configuration of the user apparatus 10. As illustrated in FIG. 13, the user apparatus 10 includes a signal transmission unit 101, a signal reception unit 102, a configuration information management unit 103, and a RA control unit 104. The signal reception unit 102 includes a measurement unit 112 configured to measure a reception quality. The functional configuration illustrated in FIG. 13 is only an example. Functional subdivision and names of the functional units are not particularly limited as long as the operations associated with the embodiment can be performed. The signal transmission unit 101 and the signal reception unit 102 may be referred to as a transmitter and a receiver respectively.

The signal transmission unit 101 generates a transmitting signal from transmission data to transmit the transmission signal by radio. The signal reception unit 102 receives by radio various signals, and obtains a signal of upper layer from a received signal of the physical layer. Also, the signal transmission unit 101 is configured to execute beamforming in the transmission side, and the signal reception unit 102 is configured to execute beamforming in the reception side.

The configuration information management unit 103 stores various configuration information received from the base station 20 by the signal reception unit 102. Content of the configuration information is, for example, information of thresholds, correspondence information between beams and RACH resources subsets and the like described so far. Also, the configuration information management unit 103 stores configuration information preconfigured in the user apparatus 10.

The RA control unit 104 executes the processing of the random access procedure in the user apparatus 10 described in the basic example and embodiments 1 and 2. Note that a functional unit related to signal transmission in the RA control unit 104 may be included in the signal transmission unit 101 and a functional unit related to signal reception in the RA control unit 104 may be included in the signal reception unit 102.

Also, for example, the signal reception unit 102 is configured to receive a plurality of predetermined signals transmitted from the base station by a plurality of beams; and the signal transmission unit 101 is configured to transmit a preamble using a resource corresponding to at least one beam of the plurality of beams, and the signal reception unit 102 is configured to measure a reception quality for each of the plurality of beams, and the signal transmission unit 101 is configured to transmit the preamble using a resource corresponding to a beam of a reception quality that satisfies a predetermined condition.

The predetermined condition is, for example, that: the reception quality is better than a predetermined threshold, or a difference between the reception quality and the best reception quality among reception qualities of the plurality of beams is smaller than a predetermined relative threshold.

The signal transmission unit 101 may be configured to use resources corresponding to a predetermined upper limit number of beams of all beams whose reception quality satisfies the predetermined condition so as to transmit the upper limit number of preambles.

The signal transmission unit 101 may be configured to perform retransmission for a preamble transmitted by a first resource using a second resource corresponding to a beam whose reception quality satisfies the predetermined condition.

The signal reception unit 102 may be configured to monitor a response for a preamble within a time window corresponding to a resource used for transmitting the preamble by the signal transmission unit 101, or the signal reception unit 102 may be configured to monitor a response for the preamble within a time window common to a plurality of resources including a resource used for transmitting the preamble by the signal transmission unit 101.

<Base Station 20>

Figure 14:
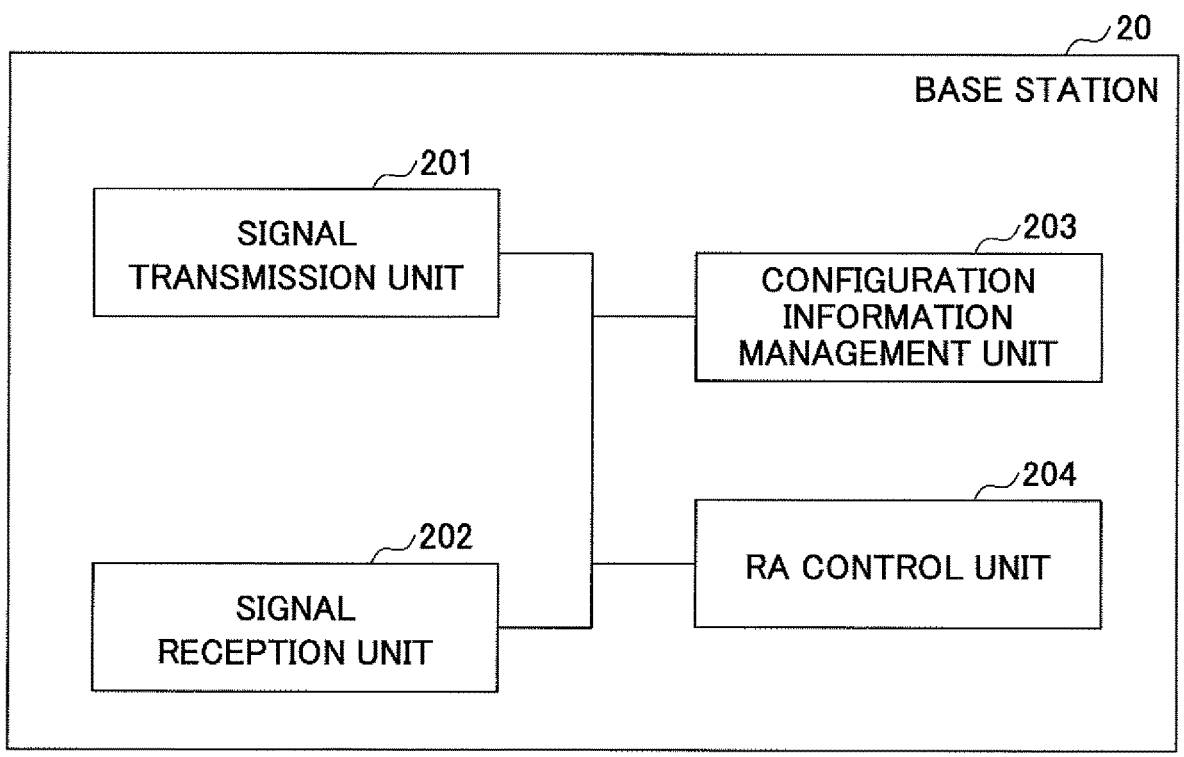
FIG. 14 is a diagram showing an example of a functional configuration of the base station 20.

FIG. 14 is a diagram illustrating an example of a functional configuration of the base station 20. As illustrated in FIG. 14, the base station 20 includes a signal transmission unit 201, a signal reception unit 202, a configuration information management unit 203 and a RA control unit 204. The functional configuration illustrated in FIG. 14 is only an example. Functional subdivision and names of the functional units are not particularly limited as long as the operations associated with the embodiment can be performed. The signal transmission unit 201 and the signal reception unit 202 may be referred to as a transmitter and a receiver respectively.

The signal transmission unit 201 includes a function configured to generate a signal to be transmitted to the user apparatus 10 side, and to transmit the signal by radio. The signal reception unit 202 includes a function configured to receive various signals transmitted from the user apparatus 10, and to obtain information of upper layer from the received signal. Also, the signal transmission unit 201 is configured to execute beamforming in the transmission side, and the signal reception unit 202 is configured to execute beamforming in the reception side.

The configuration information management unit 203 stores various configuration information to be transmitted to the user apparatus 10. Content of the configuration information is, for example, threshold information, correspondence information described so far. Also, the configuration information management unit 203 stores configuration information preconfigured in the base station 20.

The RA control unit 204 executes the processing of the random access procedure in the base station 20 described in the embodiments 1 and 2. Note that a functional unit related to signal transmission in the RA control unit 204 may be included in the signal transmission unit 201 and a functional unit related to signal reception in the RA control unit 204 may be included in the signal reception unit 202.

<Hardware Configuration>

The block diagrams (FIGS. 13 and 14) which are used above to describe the embodiments illustrate blocks in the units of functions. The functional blocks (constituent units) are embodied in an arbitrary combination of hardware and/or software. Means for embodying the functional blocks is not particularly limited. That is, the functional blocks may be embodied by one unit in which a plurality of components are physically and/or logically coupled, or may be embodied by two or more devices which are physically and/or logically separated and which are connected directly and/or indirectly (for example, in a wired and/or wireless manner).

Figure 15:
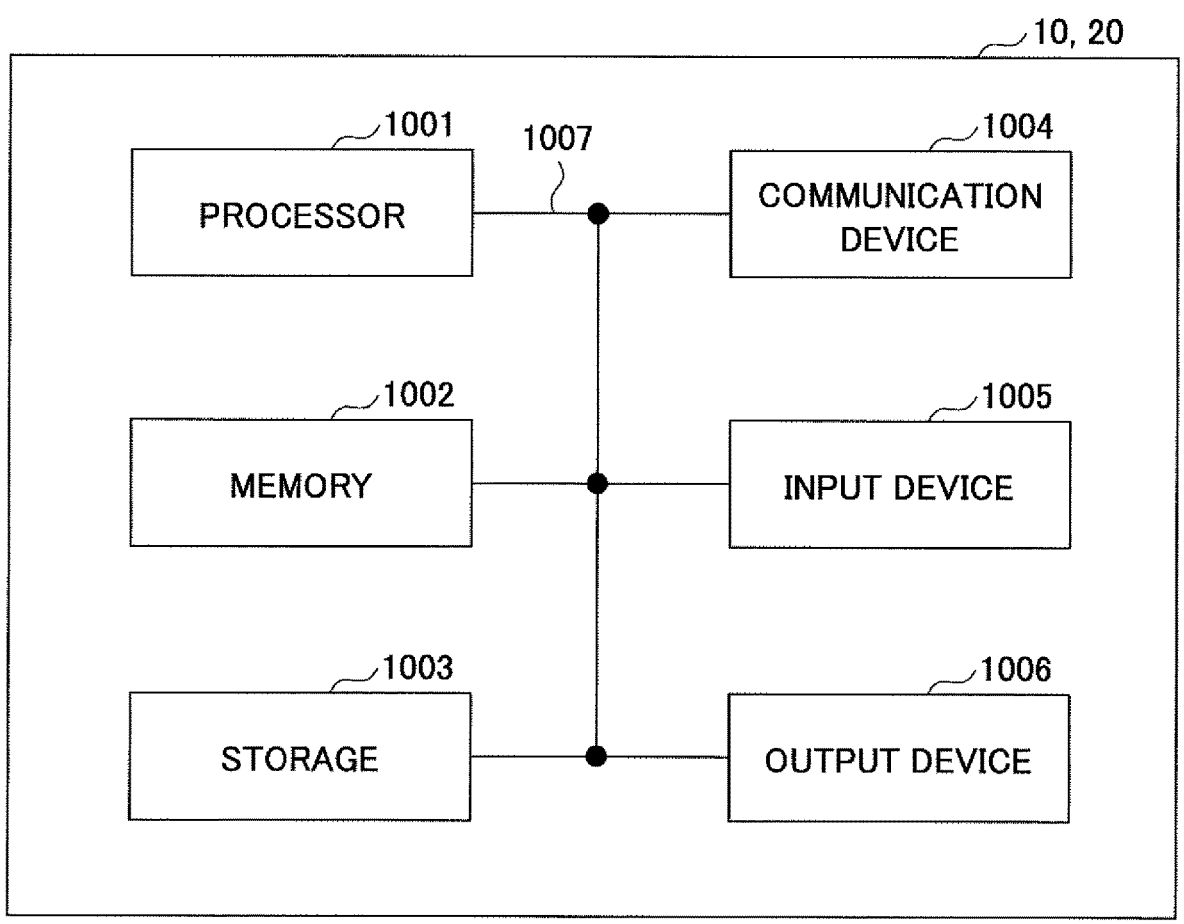
FIG. 15 is a diagram showing an example of a hardware configuration of the user apparatus 10 and the base station 20.

For example, the user apparatus 10 and the base station 20 according to this embodiment may function as computers that perform the processes according to this embodiment. FIG. 15 is a diagram illustrating an example of a hardware configuration of the user apparatus 10 and the base station 20 according to this embodiment. The user apparatus 10 and the base station 20 may be physically configured as a computer device including a processor 1001, a memory 1002, a storage 1003, a communication device 1004, an input device 1005, an output device 1006, and a bus 1007.

In the following description, a word "device" may be referred to as a circuit, a device, a unit, or the like. The hardware configurations of the user apparatus 10 and the base station 20 may include one or more devices indicated by reference numerals 1001 to 1006 in the drawing or may not include some devices thereof.

The functions of the user apparatus 10 and the base station 20 are realized by causing hardware such as the processor 1001 and the memory 1002 to read predetermined software (a program) and causing the processor 1001 to perform calculation and to control communication of the communication device 1004 and reading and/or writing of data in the memory 1002 and the storage 1003.

The processor 1001 controls the computer as a whole, for example, by activating an operating system. The processor 1001 may be constituted by a central processing device (CPU: central processing unit) including an interface with peripherals, a control device, a calculation device, a register, and the like.

The processor 1001 reads a program (program codes), a software module, or data from the storage 1003 and/or the communication device 1004 to the memory 1002 and performs various processes in accordance therewith. As the program, a program causing a computer to perform at least a part of the operations described above in the embodiment is used. For example, the signal transmission unit 101, the signal reception unit 102, the configuration information managing unit 103 and the RA control unit 104 of the user apparatus 10 shown in FIG. 13 may be embodied by a control program which is stored in the memory 1002 and operated by the processor 1001. The signal transmission unit 201, the signal reception unit 202, the configuration information management unit 203 and the RA control unit 204 of the base station 20 shown in FIG. 14 may be embodied by a control program which is stored in the memory 1002 and operated by the processor 1001. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage device). The memory 1002 can store a program (program codes), a software module, or the like which can be executed to perform the processes according to the embodiment.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage device. Examples of the recording medium may include a database including the memory 1002 and/or the storage 1003, a server, and another appropriate medium.

The communication device 1004 is hardware (a transceiver device) that allows communication between computers via a wired and/or wireless network and is referred to as, for example, a network device, a network controller, a network card, or a communication module. For example, the signal transmission unit 101 and the signal reception unit 102 of the user apparatus 10 may be embodied by the communication device 1004. The signal transmission unit 201 and the signal reception unit 202 of the base station 20 may be embodied by the communication device 1004.

The input device 1005 is an input device (such as a keyboard, a mouse, a microphone, a switch, a button, or a sensor) that receives an input from the outside. The output device 1006 is an output device (such as a display, a speaker, or an LED lamp) that performs outputting to the outside. The input device 1005 and the output device 1006 may be configured as a unified body (such as a touch panel).

The devices such as the processor 1001 and the memory 1002 are connected to each other via the bus 1007 for transmitting and receiving information. The bus 1007 may be constituted by a single bus or may be configured by different buses for the devices.

The user apparatus 10 and the base station 20 may be configured to include hardware such as a microprocessor, a digital signal processor (DSP), an application specific integrated circuit (ASIC), a programmable logic device (PLD), or a field programmable gate array (FPGA), or a part or all of the functional blocks may be embodied by the hardware. For example, the processor 1001 may be implemented by at least one hardware module of these.

Summary of Embodiments

As described above, according to the present embodiment, there is provided a user apparatus in a radio communication system including a base station and the user apparatus, including: a reception unit configured to receive a plurality of predetermined signals transmitted from the base station by a plurality of beams; and a transmission unit configured to transmit a preamble using a resource corresponding to at least one beam of the plurality of beams, wherein the reception unit measures a reception quality for each of the plurality of beams, and the transmission unit transmits the preamble using a resource corresponding to a beam of a reception quality that satisfies a predetermined condition.

According to the above configuration, a random access procedure to which beamforming is applied can be properly executed while avoiding performance deterioration and avoiding giving interference.

The predetermined condition is, for example, that: the reception quality is better than a predetermined threshold, or a difference between the reception quality and the best reception quality among reception qualities of the plurality of beams is smaller than a predetermined relative threshold. According to this configuration using a threshold, accurate processing can be performed quickly.

The transmission unit may use resources corresponding to a predetermined upper limit number of beams of all beams whose reception quality satisfies the predetermined condition so as to transmit the upper limit number of preambles. According to this configuration, since the number of preambles can be restricted, for example, useless resource use can be suppressed.

The transmission unit may retransmit a preamble transmitted by a first resource using a second resource corresponding to a beam whose reception quality satisfies the predetermined condition. According to this configuration, retransmission can be performed using proper resources.

The reception unit may monitor a response for a preamble within a time window corresponding to a resource used for transmitting the preamble by the transmission unit, or the reception unit may monitor a response for the preamble within a time window common to a plurality of resources including a resource used for transmitting the preamble by the transmission unit. According to this configuration, the response for the preamble can be monitored in a proper time window.

Complement of Embodiment

While embodiments of the invention have been described above, the invention disclosed herein is not limited to the embodiments and it will be understood by those skilled in the art that various modifications, corrections, alternatives, substitutions, and the like can be made. While description has been made using specific numerical value examples for the purpose of promoting understanding of the invention, such numerical values are only simple examples and arbitrary appropriate values may be used unless otherwise specified. The sorting of items in the above description is not essential to the invention, details described in two or more items may be combined for use if necessary, or details described in a certain item may be applied to details described in another item (unless incompatible). Boundaries between functional units or processing units in the functional block diagrams cannot be said to be necessarily correspond to boundaries of physical components. Operations of a plurality of functional units may be physically performed by one component, or an operation of one functional unit may be physically performed by a plurality of components. The processing sequences described above may be changed in the order as long as they are not incompatible with each other. For the purpose of convenience of description, while a user apparatus 10 and a base station 20 have been described above with reference to functional block diagrams, such apparatuses may be embodied by hardware, by software, or by combination thereof. Each of software which is executed by a processor of the user apparatus 10 and software which is executed by a processor of the base station 20 in the embodiments of the invention may be stored in an appropriate storage medium such as a random access memory (RAM), a flash memory, a read only memory (ROM), an EPROM, an EEPROM, a register, a hard disk (HDD), a removable disk, a CD-ROM, a database, or a server.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, flowcharts and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station 20 in this specification may be performed by an upper node thereof in some cases. In a network including one or more network nodes including a base station 20, various operations which are performed to communicate with a user apparatus 10 can be apparently performed by the base station 20 and/or network nodes (for example, an MME or an S-GW can be considered but the network nodes are not limited thereto) other than the base station 20. A case in which the number of network nodes other than the base station 20 is one has been described above, but a combination of plural different network nodes (for example, an MME and an S-GW) may be used.

The aspects described in this specification may be used alone, may be used in combination, or may be switched with implementation thereof.

The user apparatus 10 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 20 may be referred to as an NodeB (NB), an enhanced NodeB (eNB), a gNB, a base station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

While the invention has been described above in detail, it is apparent to those skilled in the art that the invention is not limited to the embodiments described in the specification. The invention can be carried out as modified and changed embodiments without departing from the concept and scope of the invention which are defined by the appended claims. Accordingly, the description in this specification is made for illustrative description and does not have any restrictive meaning.

This patent application is based upon and claims the benefit of priority of Japanese Patent Application No. 2017-019142 filed on Feb. 3, 2017, and the entire contents of Japanese Patent Application No. 2017-019142 are incorporated herein by reference.

LIST OF REFERENCE SYMBOLS 10 user apparatus
101 signal transmission unit
102 signal reception unit
112 measurement unit
103 configuration information management unit
104 RA control unit
20 base station
201 signal transmission unit
202 signal reception unit
203 configuration information management unit
204 RA control unit
1001 processor
1002 memory
1003 storage
1004 communication device
1005 input device
1006 output device

The invention claimed is:

1. A terminal comprising:
a transceiver coupled to a processor that measures power of synchronization signal blocks received from a base station,
wherein the processor selects a synchronization signal block with measured power above a threshold,
wherein the transceiver transmits a preamble using a resource corresponding to the selected synchronization signal block, and
wherein the transceiver performs retransmission for preamble transmission that uses the resource, the retransmission being performed using another resource corresponding to the selected synchronizations signal block or another synchronization signal block with measured power above the threshold.

2. A terminal comprising:
a transceiver coupled to a processor that measures power of synchronization signal blocks received from a base station,
wherein the processor selects a synchronization signal block with measured power above a threshold,
wherein the transceiver transmits a preamble using a resource corresponding to the selected synchronization signal block, and
wherein responsive to determining that random access response reception by the transceiver for a preamble transmitted using the resource is not successful, the transceiver performs another preamble transmission using another resource corresponding to the selected synchronization signal block or another synchronization signal block with received power above the threshold.

3. The terminal as claimed in claim 1, wherein the transceiver receives the threshold from the base station.

4. The terminal as claimed in claim 3, wherein the synchronization signal block includes a synchronization signal and a broadcast channel.

5. The terminal as claimed in claim 1, wherein the synchronization signal block includes a synchronization signal and a broadcast channel.

6. The terminal as claimed in claim 2, wherein the transceiver receives the threshold from the base station.

7. The terminal as claimed in claim 2, wherein the synchronization signal block includes a synchronization signal and a broadcast channel.

8. A base station comprising:
a transmitter that transmits synchronization signal blocks; and
a receiver that receives a preamble transmitted by a terminal using a resource corresponding to a synchronization signal block with measured power above a threshold,
wherein the receiver receives a preamble by retransmission for preamble transmission that uses the resource, the retransmission being performed using another resource corresponding to the synchronization signal block or another synchronization signal block with measured power above the threshold.

9. A base station comprising:
a transmitter that transmits synchronization signal blocks; and
a receiver that receives a preamble transmitted by a terminal using a resource corresponding to a synchronization signal block with measured power above a threshold,
wherein responsive to determining that random access response transmission by the transmitter for a preamble received using the resource is not successful, the receiver performs another preamble reception using another resource corresponding to the synchronization signal block or another synchronization signal block with received power above the threshold.

10. A radio communication method for a terminal comprising:
- measuring power of synchronization signal blocks received from a base station;
- selecting a synchronization signal block with measured power above a threshold;
- transmitting a preamble using a resource corresponding to the selected synchronization signal block; and
- performing retransmission for preamble transmission that uses the resource, the retransmission being performed using another resource corresponding to the selected synchronization signal block or another synchronization signal block with measured power above the threshold.

11. A radio communication method for a terminal comprising:
- measuring power of synchronization signal blocks received from a base station;
- selecting a synchronization signal block with measured power above a threshold; and
- transmitting a preamble using a resource corresponding to the selected synchronization signal block,
- wherein responsive to determining that random access response transmission for a preamble received using the resource is not successful, another preamble reception is performed using another resource corresponding to the selected synchronization signal block or another synchronization signal block with received power above the threshold.

* * * * *